United States Patent [19]

Tanaka et al.

[11] Patent Number: 5,204,731

[45] Date of Patent: Apr. 20, 1993

[54] METHOD AND APPARATUS FOR MEASURING THE COORDINATES OF A SURVEYED POINT

[75] Inventors: Masayoshi Tanaka, Isehara; Haruo Fukawa, Odawara; Masamitsu Endo, Gotenba; Ichiro Kadowaki, Tokyo; Yasuo Hayama, Ninomiyamachi, all of Japan

[73] Assignee: Sokkisha Co., Ltd., Japan

[21] Appl. No.: 618,856

[22] Filed: Nov. 28, 1990

[30] Foreign Application Priority Data

Dec. 4, 1989 [JP] Japan .................................. 1-313514
Dec. 8, 1989 [JP] Japan ............................. 1-142314[U]

[51] Int. Cl.$^5$ ......................... G01C 3/00; G01C 3/08; G01B 11/26
[52] U.S. Cl. .......................................... 356/1; 356/4; 356/5; 356/152; 359/530
[58] Field of Search ................... 356/1, 4, 5, 141, 152; 359/527, 529, 530

[56] References Cited

U.S. PATENT DOCUMENTS

| | | | |
|---|---|---|---|
| 3,604,805 | 9/1971 | Scott | 356/5 |
| 3,664,748 | 5/1972 | Bezu | 356/152 |
| 4,026,655 | 5/1977 | Gunter, Jr. | 359/529 |
| 4,099,050 | 7/1978 | Sauermann | 359/529 |
| 4,123,165 | 10/1978 | Brown et al. | 356/152 |
| 4,343,550 | 8/1982 | Buckley | 356/5 |
| 4,346,989 | 8/1982 | Gort et al. | 356/5 |
| 4,691,446 | 9/1987 | Pitches et al. | 356/1 |
| 4,988,189 | 1/1991 | Kroupa et al. | 356/1 |
| 5,022,751 | 6/1991 | Howard | 356/1 |

FOREIGN PATENT DOCUMENTS 3304317 8/1984 Fed. Rep. of Germany .
2204689 11/1988 United Kingdom .

Primary Examiner—Stephen C. Buczinski
Attorney, Agent, or Firm—Armstrong, Nikaido, Marmelstein, Kubovcik & Murray

[57] ABSTRACT

The invention relates to a method and apparatus for measuring the coordinates of a survey point. The apparatus uses a reflecting mirror at the survey point, a tachymeter for transmitting light to the reflecting mirror and for receiving light reflected from the reflecting mirror, first calculating means for calculating the coordinate values of two positions of the reflecting mirror, and second calculating means for calculating a coordinate value of the survey point from the coordinate values of the two reflecting mirror positions. In operation, the tachymeter transmits light to the reflecting mirror at the survey point wherein the reflecting mirror is locatable at two points present on a line passing through the survey point and which are separated from the survey point by predetermined distances. Using the reflected light from the two reflecting mirror positions, the tachymeter calculates distances between the tachymeter and the reflecting mirror at the two points from a phase difference between a received signal based on the reflected light and a reference signal. Further, the tachymeter calculates the coordinates of the survey point from a horizontal plane angle and a vertical plane angle of the reflecting mirror positions. Finally, the coordinate value of the survey point is calculated from the coordinate values of the two reflecting mirror positions.

27 Claims, 10 Drawing Sheets

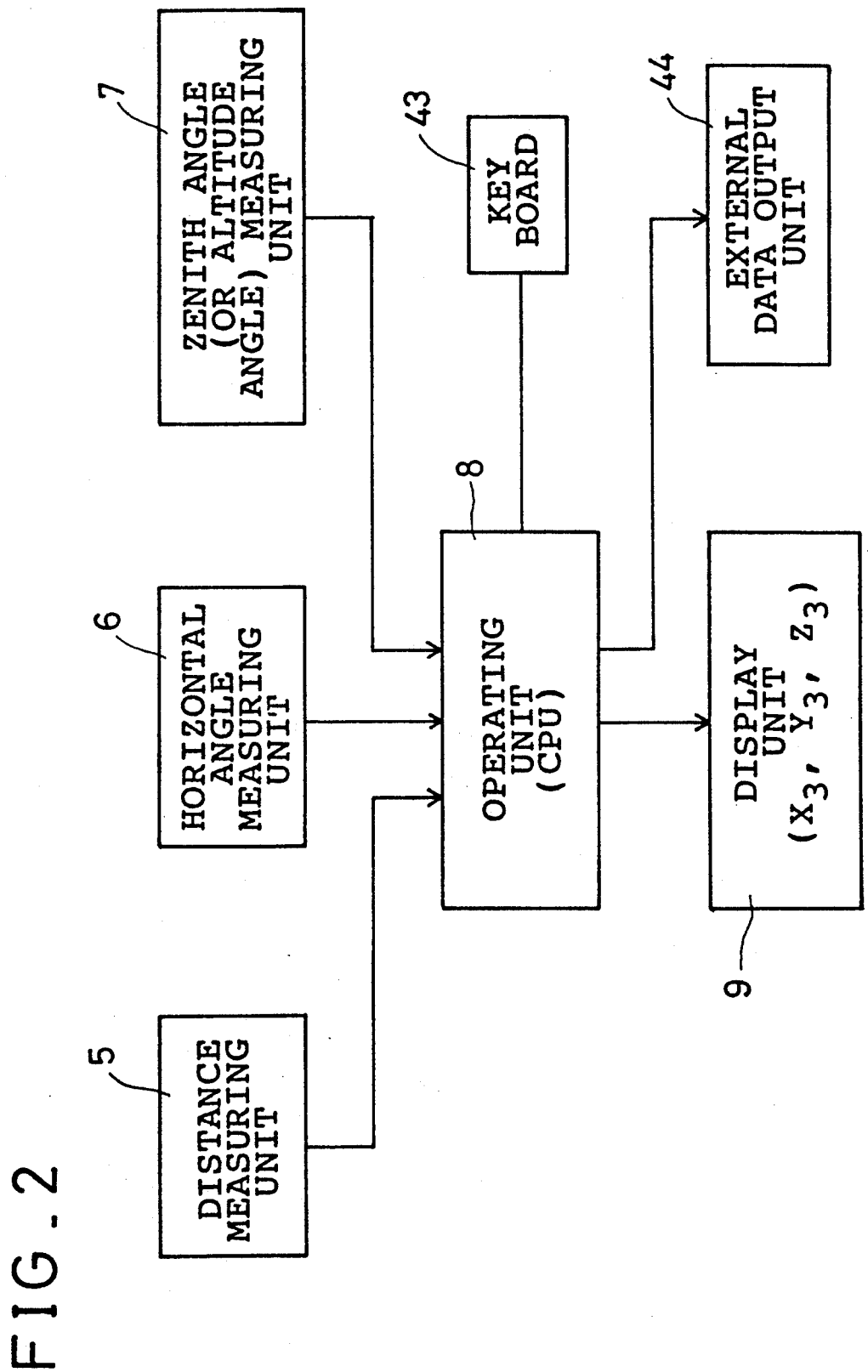
FIG._2

FIG.4
FIG.19
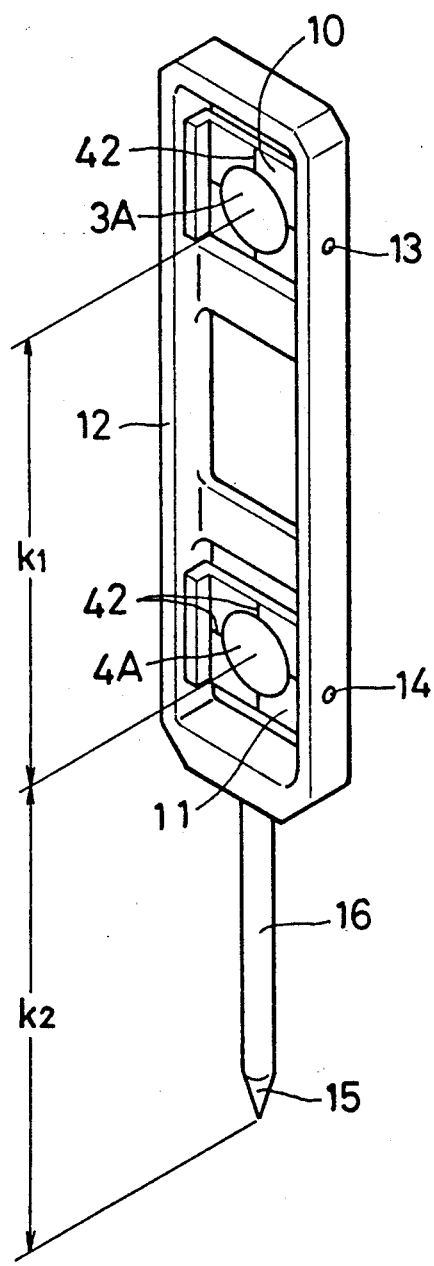
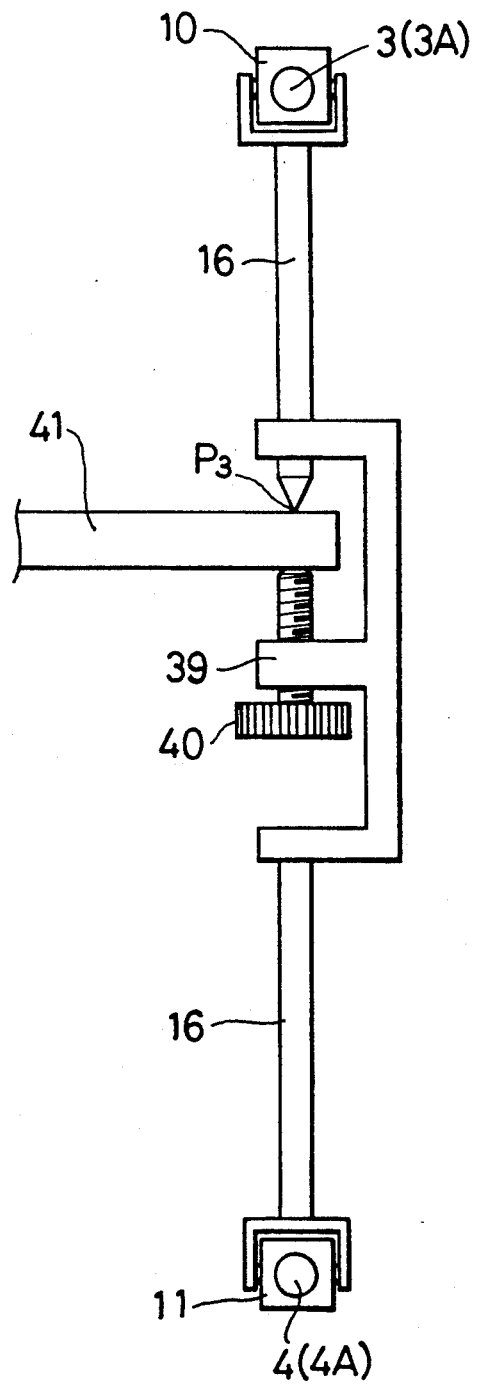

FIG.9
FIG.8
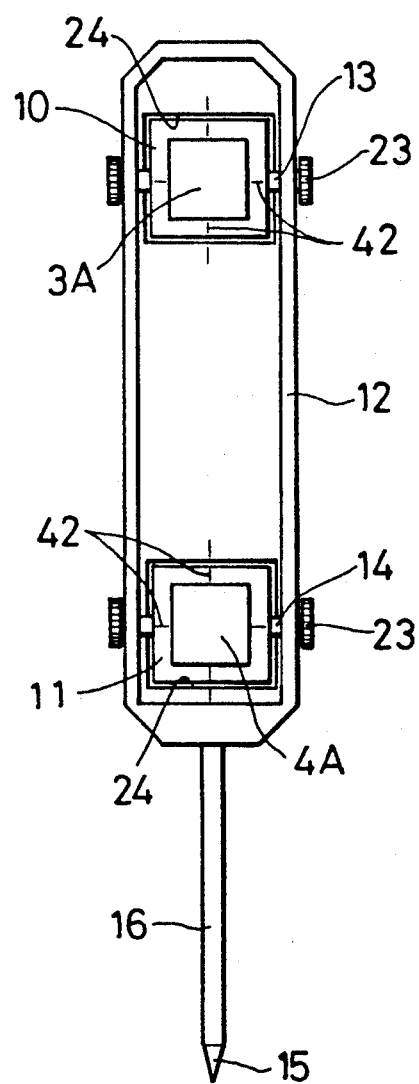
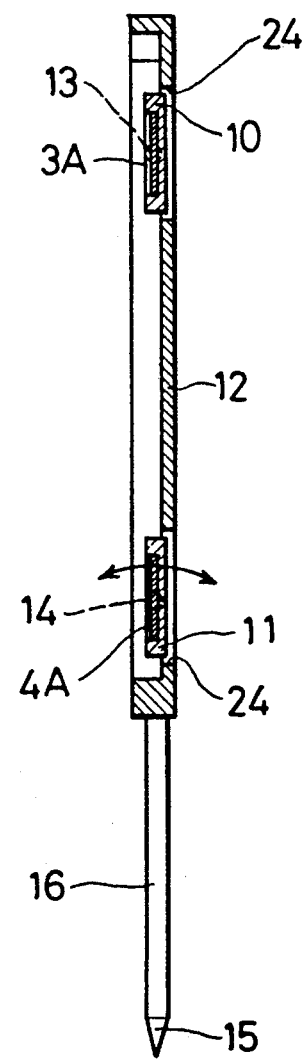

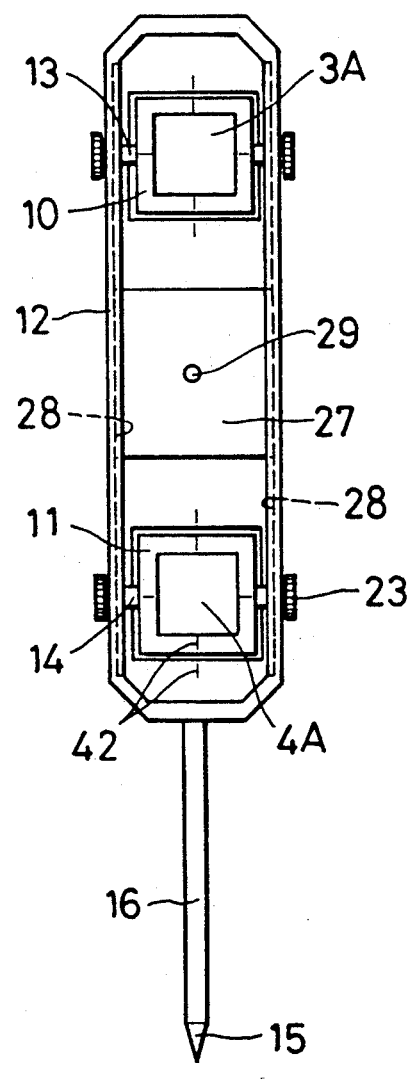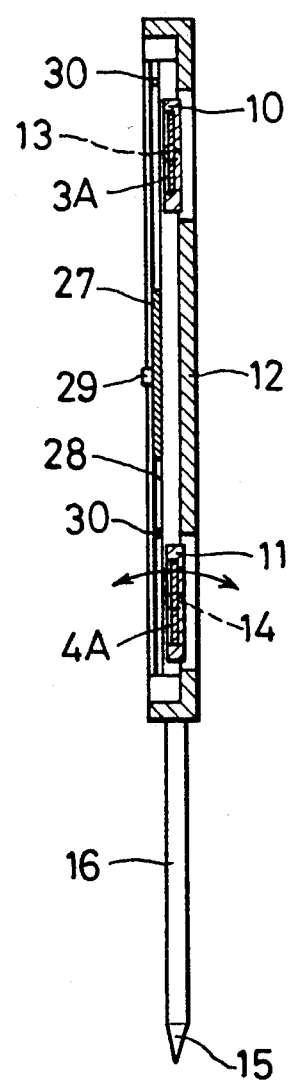

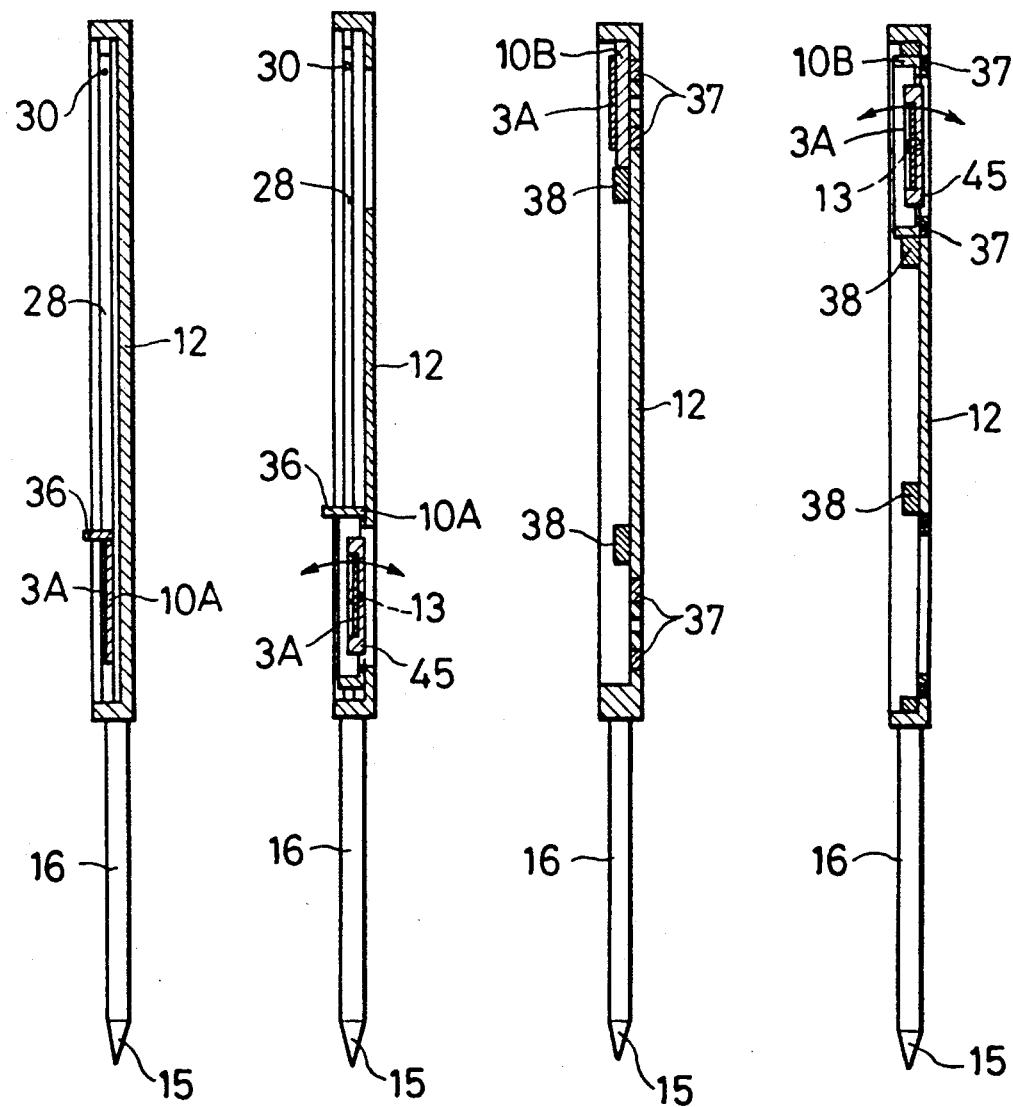

METHOD AND APPARATUS FOR MEASURING THE COORDINATES OF A SURVEYED POINT

BACKGROUND OF THE INVENTION

This invention relates to a method of measuring coordinates to obtain a coordinate value of a survey point with a tachymeter, to an apparatus for measuring those coordinates, as well as to a reflecting mirror apparatus for reading the coordinates, both apparatuses being used for carrying out the method.

Conventionally, the coordinate value of a survey point $P_3$ is obtained in the following manner. As shown in FIG. 20, a tachymeter a positioned at a survey reference point $P_O$ is levelled, and a pole c having a reflecting mirror b mounted thereon is vertically positioned at the survey point $P_3$. This pole c is provided with a bubble tube d, which can be referred to in maintaining the pole in a vertical position. Under these conditions, when light is transmitted from the tachymeter a, the transmitted light is reflected at the reflecting mirror b, and the reflected light is received by a photoresponsive element. From a phase difference between a received signal outputted by the photoresponsive element and a reference signal, a distance S between the survey reference point $P_O$ and the survey point $P_3$ is obtained with the tachymeter a. Then, a horizontal plane angle and a vertical plane angle $\Theta z$ relative to the tachymeter at the survey reference point $P_O$ can be obtained with the tachymeter by making the N or the S direction be the x axis or y axis, or by providing an imaginary coordinate system to make its axes a reference, or by aligning to the coordinate system of a datum point in the survey area. Using the above-mentioned distance S, the horizontal plane angle and the vertical plane angle $\Theta_z$ (a zenith angle or an altitude angle), the coordinate value of the reflecting mirror can also be obtained. Then, the coordinate value of the survey point $P_3$ is obtained by deducting the height Ph of the reflecting mirror.

FIG. 21 shows a flow diagram of a conventional surveying (measuring) method of obtaining the coordinate value of the survey point.

As can be seen from the flow diagram, the machine height Mh and height Ph of the reflecting mirror are inputted into a surveying apparatus which includes the tachymeter, before carrying out the surveying. This machine height Mh is inputted whenever the survey reference point $P_O$ is moved, and the height Ph of the reflecting mirror d is inputted whenever the survey point $P_3$ is changed.

According to the above-mentioned conventional method of measuring the coordinates, the pole c must be positioned vertically at the survey point $P_3$ prior to the surveying. When a tripod is used in place of the pole c, a levelling plate on the tripod must be levelled. Additionally, whenever the survey point $P_3$ is changed, the height Ph of the reflecting mirror b must be inputted into the surveying apparatus. Consequently, the measuring work is troublesome.

This invention seeks to solve these conventional problems.

SUMMARY OF THE INVENTION

In order to solve the above problems, the invention relates to a method of measuring coordinates comprising the steps of: transmitting light from a tachymeter to a reflecting mirror which is provided at a survey point wherein the reflecting mirror is locatable at two points which are present on a line passing through the survey point and which are separated from the survey point by predetermined distances for obtaining distances between the tachymeter and the reflecting mirror at the two points from a phase difference between a received signal and a reference signal; and calculating coordinates of the survey point from a horizontal plane angle and a vertical plane angle of the reflecting mirror, each of the angles being obtained by the tachymeter. The coordinate values of the two points are calculated so as to determine a coordinate value of the survey point from the coordinate values of the two points.

The invention also encompasses an apparatus for measuring coordinates that comprises a reflecting mirror at the survey point; a tachymeter for transmitting light to the reflecting mirror to obtain distances to the mirror from a phase difference between a received signal and a reference signal as well as a horizontal plane angle and a vertical plane angle of the reflecting mirror; first calculating means for calculating coordinate values of two reflecting mirror positions which are present on a line passing through the survey point and which are separated from the survey point by predetermined distances; and second calculating means for calculating a coordinate value of the survey point from the coordinate values of the two reflecting mirror positions.

The invention further encompasses the reflecting mirror apparatus for reading coordinates for use in an apparatus for measuring coordinates, the apparatus for measuring coordinates being for:

transmitting light from a tachymeter for reflection thereof at two points which are on a line passing through a survey point and which are separated from the survey point by predetermined distances;

obtaining distances to the two points from a phase difference between a received signal from each of the two points and a reference signal;

obtaining respective coordinate values of the two points from a horizontal plane angle and a vertical plane angle of the two points; and obtaining a coordinate value of the survey point from the coordinate values of the two points wherein reflecting mirror means for reflecting the light transmitted from the tachymeter at the two points is disposed on a supporting member.

One aspect of the invention is a reflecting mirror apparatus, wherein the reflecting mirror means comprises two mirrors which are supported at the two points on the supporting member by horizontal supporting axes so as to be rotatable for adjusting their inclinations.

The invention can incorporate a reflecting mirror apparatus wherein the two reflecting mirrors are supported on the supporting means by horizontal supporting axes so as to be reversible.

Another aspect of the invention can also incorporate a reflecting mirror apparatus wherein the reflecting mirror means comprises two mirrors which are respectively disposed at the two points on the supporting member and are provided with a light-shielding member for shielding the light incident on the two mirrors.

The invention can also incorporate a reflecting mirror apparatus wherein the light-shielding member is a cap for covering the two mirrors.

The invention also can use a reflecting mirror apparatus wherein the light-shielding member is a shutter which slides in front of the two mirrors.

A further aspect of the invention incorporates a reflecting mirror apparatus wherein the reflecting mirror means comprises a single mirror which is removably supportable on the supporting member at the two points.

The invention can use a reflecting mirror apparatus wherein the single mirror is held in position by attraction with magnet means.

BRIEF DESCRIPTION OF THE DRAWINGS

The invention will be more fully understood through the following description taken in conjunction with the accompanying drawings wherein:

FIG. 2 is a block diagram of an apparatus for measuring coordinates according to the invention;

FIG. 4 is a perspective view of a second embodiment of a reflecting mirror apparatus of the invention;

FIGS. 8 and 9 are, respectively, a sectional view and a plan view of a third embodiment of the reflecting mirror apparatus of the invention;

FIGS. 11 and 12 are, respectively, a plan view and a sectional view of a fifth embodiment of the reflecting mirror apparatus of the invention;

FIGS. 15 and 16 are, respectively, sectional views of a seventh and an eighth embodiment of the reflecting mirror apparatus of the invention;

FIGS. 17 and 18 are, respectively, sectional views of a ninth and a tenth embodiment of the reflecting mirror apparatus of the invention;

FIG. 19 is a front view of an eleventh embodiment of the reflecting mirror apparatus of the invention;

DETAILED DESCRIPTION OF THE INVENTION

The reflecting mirror apparatus has, on the supporting member, reflecting mirrors which reflect light transmitted from the tachymeter at two points which are on a line passing through the survey point and which are separated from the survey point at a predetermined distance. The apparatus is erected at the survey point at an arbitrary angle. The light transmitted from the tachymeter is reflected at the reflecting mirrors, and the distances from the tachymeter to the reflecting mirrors are obtained from the phase differences between the received signals and the reference signals. The coordinate values $(x_1, y_1, z_1)$ $(x_2, y_2, z_2)$ of the two points are obtained from the distances, the horizontal plane angles, and the vertical plane angles which are obtained by the tachymeter. The coordinate value $(x_3, y_3, z_3)$ of the survey point $P_3$ is obtained by substituting into the following formula the coordinate values $(x_1, y_1, z_1)$ $(x_2, y_2, z_2)$ of the two points, the distance $k_1$ (constant) between the two points which has been set at a predetermined value, and the distance $k_2$ (constant) between the survey point and one of the two points (coordinate values $x_2$, $y_2$, $z_2$).

$$x_3 = \frac{(k_1 + k_2) x_2}{k_1} - \frac{k_2}{k_1} x_1 \qquad (1)$$

$$y_3 = \frac{(k_1 + k_2) y_2}{k_1} - \frac{k_2}{k_1} y_1$$

$$z_3 = \frac{(k_1 + k_2) z_2}{k_1} - \frac{k_2}{k_1} z_1$$

In formula (1), $k_2$ is in the positive (+) range when the survey point is positioned in the external division point relative to the two reflective mirrors, and in the negative (−) range when the survey point is in the internal division point.

Embodiments are explained hereinbelow with reference to the drawings.

Figure 1:
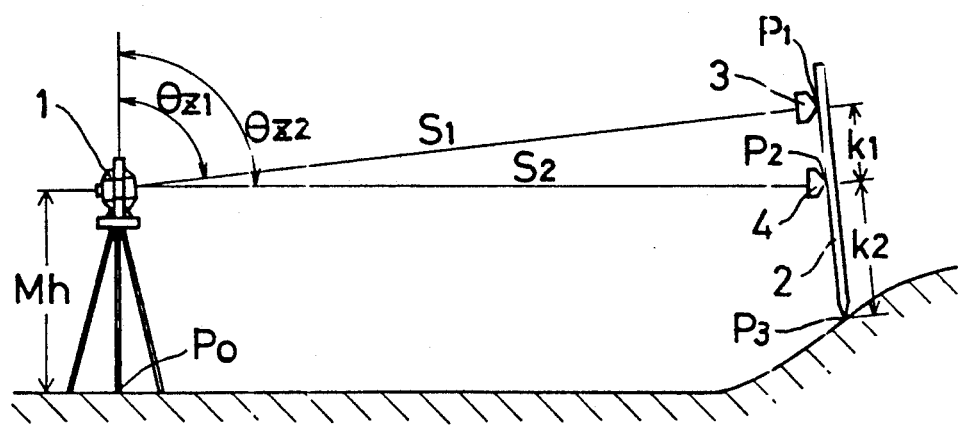
FIG. 1 is an explanation diagram of an embodiment of a method of the invention.
Figure 20:
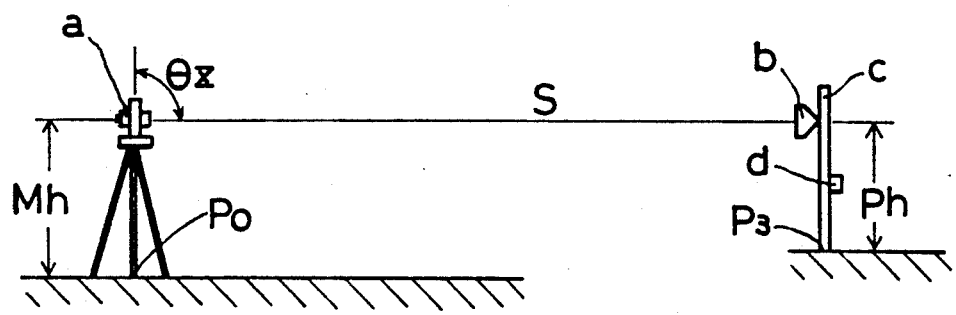
FIG. 20 is an explanation diagram of a conventional method of measuring coordinates.

FIG. 1 is an explanation diagram of the method as set forth in this invention.

In the figure, numeral 1 is a tachymeter of an apparatus for measuring coordinates in accordance with this invention, the tachymeter being levelled at a survey (measuring) reference point $P_O$. Numeral 2 is a pole which is erected at a survey point $P_3$ at an arbitrary angle.

A reflecting prism 4 is fixedly screwed onto the pole 2 at a point $P_2$ which is separated from the survey point $P_3$ by a distance $k_2$ (constant). Another reflecting prism 3 is fixedly screwed on to the pole 2 at a point $P_1$ which is separated from the point $P_2$ by a distance $k_1$ (constant). The image reflecting surfaces of the prisms 3, 4 under these conditions are located on the axial line of the pole 2. It is assumed that the coordinate values of the two points corresponding to the above-mentioned points $P_1$ and $P_2$ are $P_1$ $(x_1, y_1, z_1)$ and $P_2$ $(x_2, y_2, z_2)$, respectively.

The tachymeter 1 of the surveying apparatus of this invention transmits light towards the reflecting prisms 3, 4. From the phase difference between received signals and reference signals, the distance $S_1$, $S_2$ to the reflecting prisms 3, 4 are obtained, along the horizontal angle and the zenith angles $\Theta z_1$, $\Theta z_2$ (or altitude angles $\Theta' z_1$, $\Theta' z_2$) of the reflecting prisms 3, 4.

The apparatus for measuring coordinates in accordance with this invention which uses the tachymeter comprises, as shown in FIG. 2, a distance measuring unit 5; a horizontal plane angle measuring unit 6; a vertical plane angle measuring unit 7 (which constitute elements of the tachymeter); an operation unit 8 which comprises a first calculating means for calculating coordinate values of two reflecting mirror positions and a second calculating means of calculating a coordinate value of the survey point from the coordinate values of the two reflecting mirrors; a display unit 9; a keyboard 43 and an external data output unit 44. The reflecting mirrors are positioned on a line passing through the survey point and which are separated from the survey point by predetermined distances. The coordinate values of the reflecting mirrors are calculated from the distances to the reflecting mirrors, the horizontal plane angles and the vertical plane angles.

Figure 3:
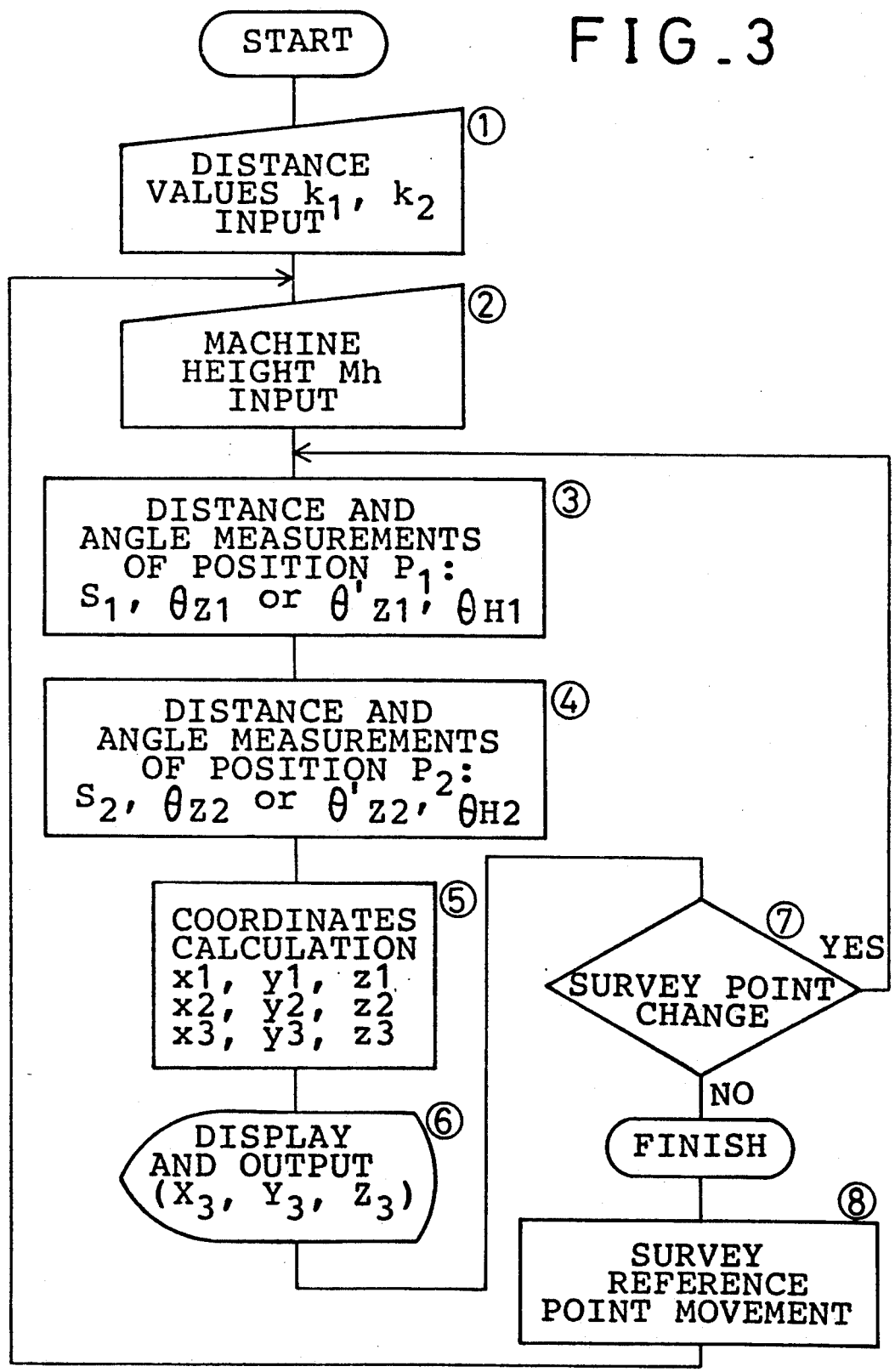
FIG. 3 is a flow diagram of the method of the invention.

The method of measuring in accordance with this invention using the apparatus for measuring shown in FIG. 2 is explained in the flow diagram shown in FIG. 3. First, the above-mentioned constant values $k_1$, $k_2$ are inputted into the measuring apparatus (step 1) and the machine height Mh of the apparatus is inputted (step 2). Then, the distance $S_1$ to the point $P_1$, the horizontal plane angle $\Theta H_1$ and the vertical plane angle (either a zenith angle $\Theta z_1$ or an altitude angle $\Theta'z_1$) of the point $P_1$, as well as the distance $S_2$ to the point $P_2$, the horizontal angle $\Theta H_2$ and the vertical plane angle (a zenith angle $\Theta z_2$ or an altitude angle $\Theta'z_2$) are measured with the distance measuring unit 5, the horizontal plane angle measuring unit 6 and the vertical plane angle (the zenith angle or altitude angle) measuring unit 7 (steps 3 and 4). Then, in the operation unit 8, the measured distance $S_1$ the point $P_1$, the horizontal plane angle $\Theta H_1$ and the zenith angle $\Theta z_1$ as well as the distance $S_2$ to the point $P_2$, the horizontal plane angle $\Theta H_2$ and the zenith angle $\Theta z_2$ are respectively substituted in the following formulas to obtain the coordinates of the point $P_1$ ($x_1$, $y_1$, $z_1$) and the coordinates of the point $P_2$ ($x_2$, $y_2$, $z_2$). ($x_1$, $y_1$, $z_1$) and the coordinates of the point $P_2$ ($x_2$, $y_2$, $z_2$).

When the altitude angles $\Theta'z_1$, $\Theta'z_2$ are measured in place of the zenith angles $\Theta z_1$, $\Theta z_2$, the altitude angles $\Theta'z_1$, $\Theta'z_2$ are converted into the zenith angles $\Theta z_1$, $\Theta z_2$ because the relationship between the zenith angles and the altitude angles is $\Theta'z_1 = \pi/2 - \Theta z_1$, and $\Theta'z_2 = \pi/2 - \Theta z_2$. The converted zenith angles $\Theta z_1 = \pi/2 - \Theta'z_1$, and $\Theta z_2 = \pi/2 - \Theta'z_2$ are then substituted in the following formulas.

$$x = x_O + S \sin \Theta z \cos \Theta_H$$
$$y = y_O + S \sin \Theta z \cos \Theta_H \quad (2)$$
$$z = z_O + Mh + S \cos \Theta z$$

where x, y, z are, respectively, the x axis coordinate value $x_1$ or $x_2$ of points $P_1$ or $P_2$, the y axis coordinate value $y_1$ or $y_2$, and the z axis coordinate value $z_1$ or $z_2$, S is the distance $S_1$ or $S_2$ to the point $P_1$ or $P_2$, $\Theta z$ is the zenith angle $\Theta z_1$ or $\Theta z_2$ of the point $P_1$ or $P_2$, $\Theta H$ is the horizontal plane angle $\Theta H_1$ or $\Theta H_2$ of the point $P_1$ or $P_2$, Mh is the machine height, and $x_O$, $y_O$, $z_O$ is the origin of an arbitrary coordinate system.

Then, the coordinate value ($x_3$, $y_3$, $z_3$) of the point $P_3$ is obtained by substituting the coordinate values of the points $P_1$ and $P_2$ in the above-mentioned formula (1) (step 5).

The operation unit 8 comprises a central processing unit (CPU) and is provided with a memory (not shown). This memory stores the above-mentioned formulas (1) and (2), as well as the coordinate value ($x_O$, $y_O$, $z_O$) of the origin of the coordinate system, distances $k_1$, $k_2$ and the machine height Mh. The origin of the coordinate system which is set at the above-mentioned inputted arbitrary system ($x_O$, $y_O$, $z_O$) may be made to be a survey (measuring) reference point $P_O$.

The obtained coordinate value of the point $P_3$ is displayed in the display unit 9 and, at the same time, is outputted as external data for storing into a data collector (not shown) (step 6). When the survey point $P_3$ is changed (step 7), the procedure is returned to step 3 to obtain a new coordinate value of the survey point $P_3$. When the survey (measuring) reference point $P_O$ is moved (step 8), the coordinate value of the survey point $P_3$ is obtained by returning to step 2.

FIG. 4 shows a second embodiment of a reflecting mirror apparatus to be used in this method of measuring.

Figure 5:
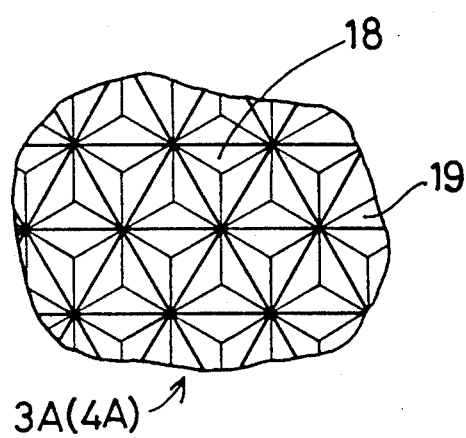
FIGS. 5 and 6 are, respectively, a plan view and a sectional view of an important portion of an example of a sheet prism to be used in the reflecting mirror apparatus of FIG. 4.
Figure 6:
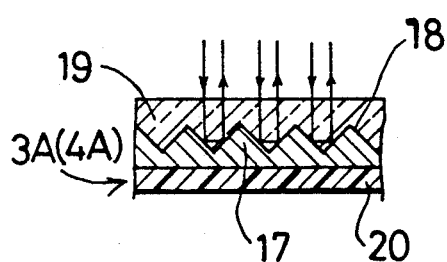

In FIG. 1, reflecting prisms are used as a reflecting mirror; in this embodiment, sheet prisms 3A, 4A are used. These sheet prisms 3A, 4A are constructed, as shown in FIGS. 5 and 6, by continuously forming a surface made up of three faces crossing each other at right angles which are identical to corner cubes (reflecting prisms) on the surface of a sheet 17 such as acrylic resin, polycarbonate resin, or the like. Additionally, on this reflecting prism surface, a reflecting film layer 18 (i.e., an aluminum vapor deposited layer) is formed: a transparent resin layer 19 is then formed on top of the reflecting film layer 18. On the bottom of the sheet 17, an adhesive layer 20 is formed for mounting the sheet 17. In the construction of the sheet prism 3A, 4A, a continuous arrangement of corner cubes allows the incident light to be totally reflected in its original direction.

Figure 7:
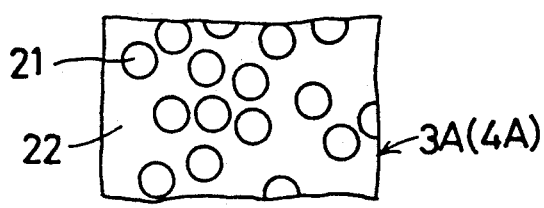
FIG. 7 is a plan view of an important portion of another example of the sheet prism.

The sheet prisms 3A, 4A may be constructed, as shown in FIG. 7, with glass beads 21 dispersed for being integrally constructed on an aluminum vapor deposited surface 22.

These sheet prisms 3A, 4A are, as shown in FIG. 4, respectively adhered to plates 10, 11. The plates 10, 11 are respectively rotatably supported by horizontal supporting axes 13, 14 which are received by a frame 12 so that their angles of inclination can be adjusted. Cross graduations 42 are marked on the plates 10, 11 for collimation. A pole 16 having a shoe 15 are provided at the bottom of the frame 12.

The image reflecting surfaces of the sheet prisms 3A, 4A coincide with the center of rotation and are made to coincide with the center axis of the pole.

The distance between the sheet prisms 3A, 4A is measured such that the light directed from the tachymeter to one of the sheet prisms 3A, 4A is not incident on the other of the sheet prisms 3A, 4A. This distance must be determined by considering the dispersion of the transmitted light of the tachymeter. For example, when the sheet prisms 3A, 4A are used for measuring the distance within 100 m, the distance therebetween is 1 m. If the sheet prisms 3A, 4A are constructed to be able to rotate 180 degrees about horizontal axes 13, 14 (see the third embodiment as shown in FIGS. 8 and 9), when one of the sheet prisms 3A or 4A is used to obtain the coordinate value thereof, the plate 10 or 11 on which the other of the sheet prisms 3A or 4A is adhered to is reversed. In this way, the light emitted to one of the sheet prisms 3A or 4A is not incident on the other of the prisms 3A or 4A. Therefore, the distance between the sheet prisms 3A and 4A can be shortened and the reflecting mirror apparatus can be made smaller.

In FIGS. 8 and 9, rotating knobs 23 are fixed to the ends of rotatable shafts which are along the horizontal axes 13, 14. Rear openings 24 are formed in the frame 12. Graduations 42 used for collimation are provided in the front of the frame 12 and on the plates 10, 11.

Figure 10:
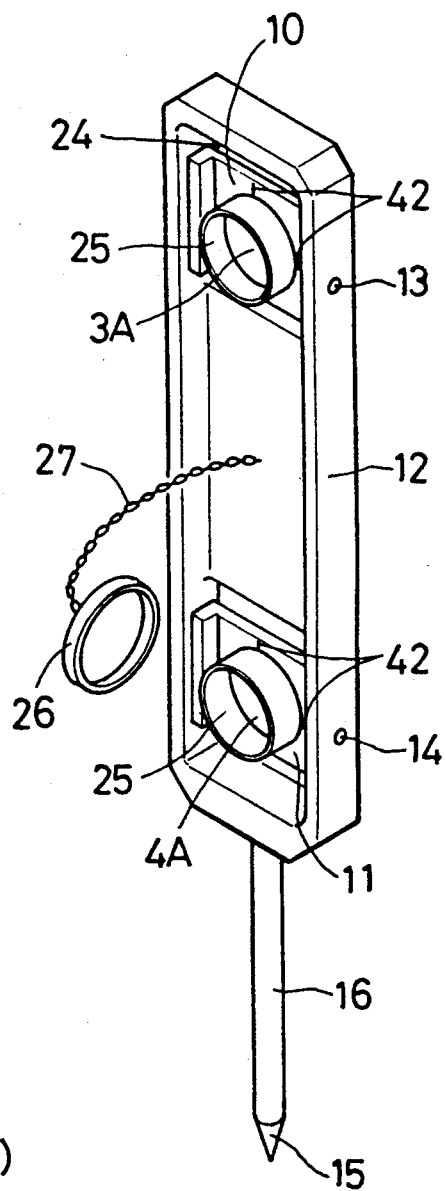
FIG. 10 is a perspective view of a fourth embodiment of the reflecting mirror apparatus of the invention.

FIG. 10 shows a fourth embodiment of a reflecting mirror apparatus of this invention.

The frame 12 has in the inside thereof rear openings 24 which are separated from each other at predetermined vertical distances. The plates 10, 11, facing the rear openings 24 are supported on the frame 12 so as to be rotatable about horizontal supporting axes 13, 14.

Cylindrical frame members 25 are formed on the plates 10, 11. Inside these cylindrical frame members 25, sheet prisms 3A, 4A are mounted, along with a cap 26 which can be attached to the cylindrical members 25. The cap 26 is connected by a chain 27 to the central portion of the frame 12.

In the construction of this embodiment, when the coordinate value of the sheet prism 3A is obtained, the cap 26 is placed on the lower cylindrical frame member 25 to cover the sheet prism 4A so that the ejected light of the tachymeter 1 only becomes incident on the sheet prism 3A. When the coordinate value of the lower sheet prism 4A is obtained, the cap 26 is placed on the upper cylindrical frame member 25 to cover the sheet prism 3A.

FIGS. 11 and 12 show a fifth embodiment of the mirror reflection apparatus of this invention.

In this embodiment, a shutter 27 is used in place of the cap 26 of the former embodiment. This shutter 27 engages at its side portions with slide grooves 28 which are formed on the internal side of both side walls of the frame 12. By using an operation knob 29, the shutter 27 can slide in front of the sheet prisms 3A, 4A so that the sheet prisms 3A, 4A may be selectively covered. Plate springs (not shown) are provided on the side portions of the shutter 27, and click stop grooves 30 are formed at predetermined positions along the slide grooves. By engaging the plate springs with the click stop grooves 30, the shutter 27 stops at a closed position for either of the sheet prisms 3A, 4A and can be maintained in that position.

The sheet prisms 3A, 4A are respectively adhered to the plates 10, 11 which are rotatable on shafts 13, 14 mounted thereon by knobs 23 at the ends of the shafts.

Figure 13:
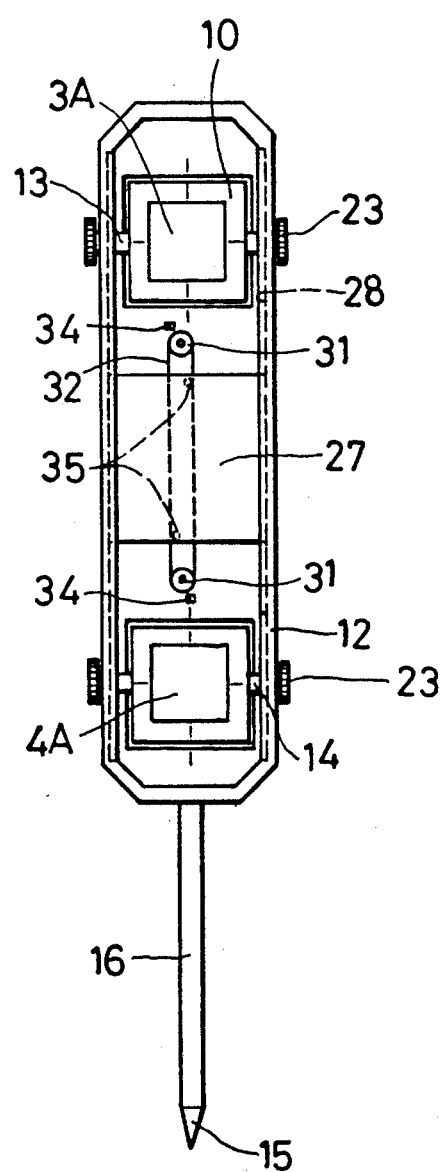
FIGS. 13 and 14 are, respectively, a plan view and a sectional view of a sixth embodiment of the reflecting mirror apparatus of the invention.
Figure 14:
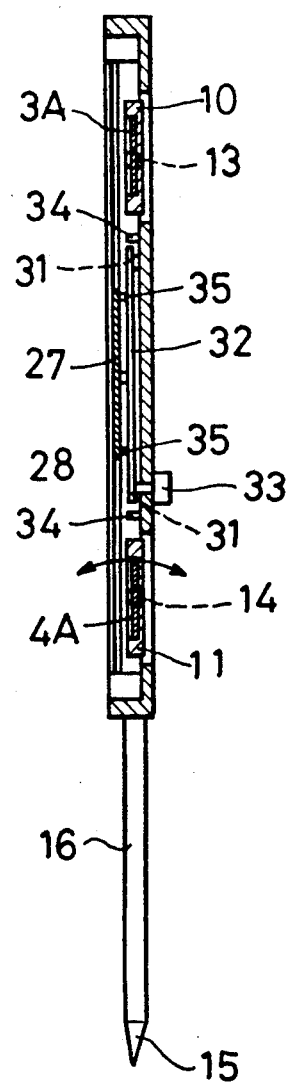
Figure 21:
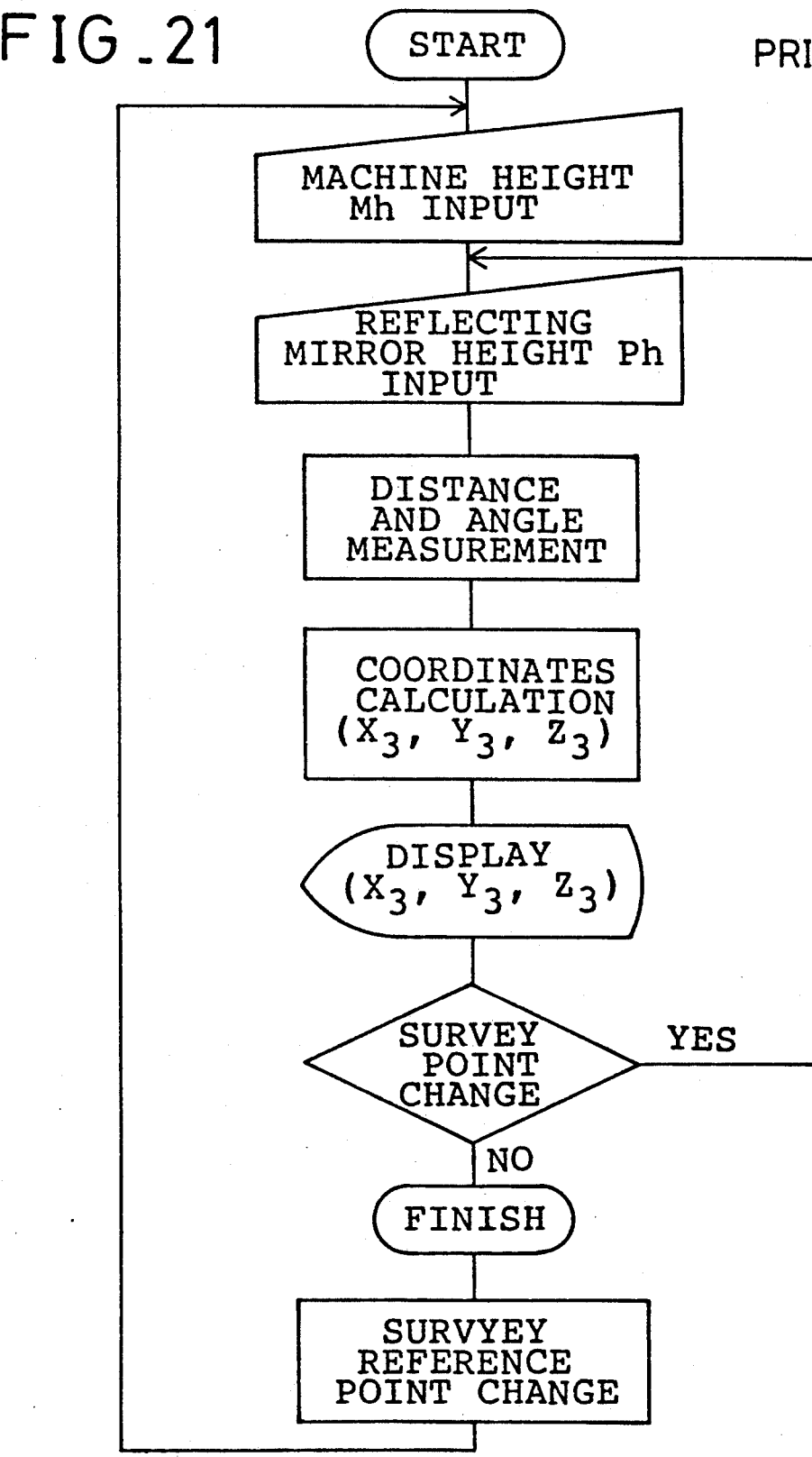
FIG. 21 is a flow diagram of a conventional method of measuring coordinates.

FIGS. 13 and 14 show a sixth embodiment of the reflection mirror apparatus of this embodiment.

In this embodiment, the shutter 27 engaged with the slide groove 28 is connected to a belt 32 which extends between two pulleys 31 so that, by driving the belt with an electric motor 33, the two sheet prisms 3A, 4A may be selectively covered. A microswitch 34 is actuated by a switching element 35 for stopping the operation of the electric motor 33 when the shutter 27 reaches a predetermined position (a position for closing the sheet prism 3A or 4A). On the rear of the frame 12, there is provided a control panel (not shown) equipped with a switch to rotate the electric motor 33 to the right and the left directions, and an electric power switch. They are constructed and operated conventionally. The plates 10, 11 to which the sheet prisms 3A, 4A are adhered are each respectively provided with a shaft 13, 14 which can be rotated by a knob 23.

FIG. 15 shows a seventh embodiment of the reflecting mirror apparatus of this invention. A plate 10A is made to be slidable when engaged with slide grooves 28 which are formed on both side walls of a rectangular frame 12. On the front surface of the plate 10A, a sheet prism 3A is adhered directly. A click stop groove 30 is formed in the slide groove 28, and a plate spring (not shown) which can be engaged with the click stop groove 30 is provided. By engaging the plate spring with the click stop groove 30, the plate 10A to be moved by a handle 36 can be stopped and held at positions corresponding to the above-mentioned two points.

Alternatively, the sheet prism 3A may be, as an eighth embodiment shown in FIG. 16, adhered to a sheet prism plate 45 which is provided with a rotatable shaft 13. In addition, the plate 10A is provided with a bearing so that the sheet prism 3A may be inclined to an appropriate angle.

FIG. 17 shows a ninth embodiment of the reflecting mirror apparatus of this invention. Permanent magnets 37 are buried in the front of a rectangular frame 12, and a sheet prism 3A is adhered to the surface of a metallic plate 10B which can be attracted by the permanent magnet 37. This plate 10B is aligned and held by the permanent magnet 37 at end positions on the frame 12 which correspond to the above-mentioned two points.

In the embodiment in FIG. 17, the sheet prism 3A cannot be rotated. As a tenth embodiment shown in FIG. 18, however, if the sheet prism 3A is adhered to a prism plate 45, a rotatable shaft 13 is provided therein, and a bearing is provided on the plate 10B, the sheet prism 3A can be rotated. An opening in which the sheet prism 3A can be rotated is provided in the frame 12 and the plate 10B.

In the above embodiments, the sheet prisms 3A, 4A are both provided on the same side as the survey point $P_3$. It is, therefore, a measurement of a survey point in an exterior division point. As shown in FIG. 19, sheet prisms 3A, 4A may be provided on both sides of the measuring point $P_3$, thus performing a measurement of a survey point in an interior division point. In this case, as described earlier, the value $k_2$ of the formula (1) is negative ($-$).

The plates 10, 11 on which sheet prisms 3A, 4A are respectively attached are tiltable on one end of poles 16 which are disposed in a straight line. The other end of the poles 16 are connected to a mounting member 39, which is mounted by clamping screws 40 on a structure 41 to be measured.

According to the invention unlike in the conventional art, it is not necessary to erect the pole in a perfectly vertical position as a supporting member provided with reflecting mirrors. Additionally, it is not necessary, whenever the measuring point is changed, to obtain the height of the reflecting mirror for use in the calculation of the coordinates. Therefore, the measuring work is made easy, and the coordinate values can be easily obtained in such places as sharply inclined areas, in the vicinity of a wall, or the like where measurement was difficult with the conventional apparatus.

Also according to the invention, the reflecting mirror apparatus can be constructed as a relatively small structure.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An apparatus for measuring coordinates of a survey point comprising:

a reflecting sheet prism locatable at two points present on a line extending through the survey point, the two points being separated from the survey point at predetermined distances, said reflecting sheet prism having a plate on which said reflecting sheet prism is mounted, the plate having cross graduations for collimation formed thereon;

a tachymeter for transmitting light to said reflecting sheet prism and for receiving light from said reflecting sheet prism resulting from light transmitted from said tachymeter such that receiving light generates a received signal in said tachymeter, said tachymeter determining distances to said reflecting sheet prism at the two points, a horizontal plane angle and a vertical plane angle relative to said tachymeter and said reflecting sheet prism at the two points, the distances to said reflecting sheet prism being based on a phase difference between the received signal and a reference signal;

first calculating means connected to said tachymeter for calculating coordinate values of the two points at which said reflecting sheet prism is locatable; and second calculating means connected to said first calculating means for calculating a coordinate value of the survey point from the coordinate values calculated for the two points for locating said reflecting sheet prism.

2. An apparatus for measuring coordinates of a survey point comprising:

reflecting sheet prism means for reflecting transmitted light and being located at two points present on a line extending through the survey point, the two points being separated from the survey point at predetermined distances, said reflecting sheet prism means having a plate on which said reflecting sheet prism means is mounted, the plate having cross graduations for collimation formed thereon;

a tachymeter for transmitting light to said reflecting sheet prism means and for receiving light from the two points as reflected by said reflecting sheet prism means resulting from light transmitted from said tachymeter such that receiving light generates a received signal for each of the two points in said tachymeter, said tachymeter determining distances to the two points at which said reflecting sheet prism means is locatable, a horizontal plane angle and a vertical plane angle relative to said tachymeter and the two points, the distances to said reflecting sheet prism means being based on a phase difference between the received signals and a reference signal;

first calculating means connected to said tachymeter for calculating coordinate values of the two points at which said reflecting sheet prism means is locatable from the horizontal plane angle and the vertical plane angle;

second calculating means connected to said first calculating means for calculating a coordinate value of the survey point from the coordinate values calculated for the two points at which said reflecting sheet prism means is locatable; and a support member for supporting said reflecting sheet prism means.

3. An apparatus for measuring coordinates of a survey point according to claim 2, wherein said reflecting sheet prism means includes two sheet prisms, each of said two mirrors being supported at one of the two points at which said reflecting sheet prism means is locatable on said support member, said support member supporting said two sheet prisms along horizontal support axes relative to said support member so as to be rotatably mounted so as to allow adjustment of inclination, each of the two sheet prisms having a plate on which each sheet prism is mounted, each plate having cross graduations for collimation formed thereon.

4. An apparatus for measuring coordinates of a survey point according to claim 3, wherein said two sheet prisms of said reflective sheet prism means are supported on the horizontal support axes on said support member such that said two sheet prisms are rotatably mounted along the horizontal support axes of said support member such that each of said two sheet prisms can rotate and face 180° relative to the other.

5. An apparatus for measuring coordinates of a survey point according to claim 2, wherein said reflecting sheet prism means includes two sheet prisms, each of said two sheet prisms being supported at one of the two points for locating said reflecting sheet prism means on said support member, said two sheet prisms being provided with a light-shielding member for shielding against light incident on said two sheet prisms, each of the two sheet prisms having a plate on which each sheet prism is mounted, each plate having cross graduations for collimation formed thereon.

6. An apparatus for measuring coordinates of a survey point according to claim 5, wherein said light-shielding member includes a cap for covering at least one of said two sheet prisms.

7. An apparatus for measuring coordinates of a survey point according to claim 5, wherein said light-shielding member includes a shutter which slides in front of at least one of said two sheet prisms.

8. An apparatus for measuring coordinates of a survey point according to claim 2, wherein said reflecting sheet prism means includes one sheet prism being removably supportable at the two points for locating said reflecting sheet prism means on said support member.

9. An apparatus for measuring coordinates of a survey point according to claim 8, further comprising:

magnet means for supporting said one sheet prism of said reflective sheet prism means in position at the two points for locating said reflecting sheet prism means.

10. An apparatus for measuring coordinates of a survey point comprising:

reflecting sheet prism means having at least one reflecting sheet prism for reflecting transmitted light and locatable at two points present on a line extending through the survey point, the two points being separated from the survey point at predetermined distances, said reflecting sheet prism means having plate on which said reflecting sheet prism means is mounted, the plate having cross graduations for collimation formed thereon;

a tachymeter for transmitting light to said reflecting sheet prism means and for receiving light from said reflecting sheet prism resulting from light transmitted from said tachymeter such that receiving light generates a received signal for the two points in said tachymeter, said tachymeter determining distances to the two points at which said reflecting sheet prism means is locatable, a horizontal plane angle and a vertical plane angle relative to said tachymeter and said reflecting sheet prism, the distances to said reflecting sheet prism being based on a phase difference between the received signal and a reference signal;

first calculating means for calculating coordinate values of the two points at which said reflecting sheet prism means is locatable from the horizontal plane angle and the vertical plane angle;

second calculating means for calculating a coordinate value of the survey point from the coordinate values calculated for the two points at which said reflecting sheet prism means is locatable; and a support member for supporting said reflecting sheet prism means.

11. An apparatus for measuring coordinates of a survey point according to claim 10 wherein said reflecting sheet prism means includes two sheet prisms, one of each said two sheet prisms being supported at the two points at which said reflecting sheet prism means is locatable on said support member, said support member supporting said sheet prism means on support member supporting said two sheet prisms along horizontal support axes relative to said support member so as to be rotatably mounted so as to allow adjustment of inclination, each of the two sheet prisms having a plate on which each sheet prism is mounted, each plate having cross graduations for collimation formed thereon.

12. An apparatus for measuring coordinates of a survey point according to claim 11, wherein said two sheet prisms of said reflective sheet prism means are supported on the horizontal support axes on said support member such that said two sheet prisms are rotatably mounted along the horizontal support axes of said support member such that each of said two sheet prisms can rotate and face 180° relative to the other.

13. An apparatus for measuring coordinates of a survey point according to claim 10, wherein said reflecting sheet prism means includes two sheet prisms, one of each said two sheet prisms being supported at the two points at which said reflecting sheet prism means is locatable on said support member, said two sheet prisms being provided with a light-shielding member for shielding against light incident on said two sheet prisms, each of the two sheet prisms having a plate on which each sheet prism is mounted, each plate having cross graduations for collimation formed thereon.

14. An apparatus for measuring coordinates of a survey point according to claim 13, wherein said light-shielding member includes a cap for covering at least one of said two sheet prisms.

15. An apparatus for measuring coordinates of a survey point according to claim 13, wherein said light-shielding member includes a shutter which slides in front of at least one of said two sheet prisms.

16. An apparatus for measuring coordinates of a survey point according to claim 10, wherein said reflecting sheet prism means includes one sheet prism being removably supportable at the two points at which said reflecting sheet prism means is locatable on said support member.

17. An apparatus for measuring coordinates of a survey point according to claim 16, wherein said one sheet prism of said reflective sheet prism means is supported in position at the two points at which said reflecting sheet prism means is locatable via magnet means.

18. A reflecting sheet prism device for reflecting transmitted light in an apparatus for measuring coordinates at a survey point and positioned at the survey point comprising:

reflecting sheet prism means locatable or located at two points present on a line extending through the survey point, the two points being separated from the survey point at predetermined distances, said reflecting sheet prism means having a plate on which said reflecting sheet prism means is mounted, the plate having cross graduations for collimation formed thereon;

a support member for supporting said reflecting sheet prism means; and mounting means for mounting said reflecting sheet prism means in said support member at the survey point.

19. A reflecting sheet prism device according to claim 18, wherein said reflecting sheet prism means includes two sheet prisms, each of said two sheet prisms being supported at one of the two points at which said reflecting sheet prism means is locatable on said support member, said support member supporting said two sheet prisms along horizontal support axes relative to said support member so as to be rotatably mounted so as to allow adjustment of inclination, each of the two sheet prisms having a plate on which each sheet prism is mounted, each plate having cross graduations for collimation formed thereon.

20. A reflecting sheet prism device according to claim 19, wherein said two sheet prisms of said reflective sheet prism means are supported on the horizontal support axes on said support member such that said two sheet prisms are rotatably mounted along the horizontal support axes of said support member such that each of said two sheet prisms can rotate and face 180° relative to the other.

21. A reflecting sheet prism device according to claim 18, wherein said reflecting sheet prism means includes two sheet prisms, each of said two sheet prisms being supported at one of the two points at which said reflecting sheet prism means is locatable on said support member, said two sheet prisms being provided with a light-shielding member for shielding against light incident on said two sheet prisms, each of the two sheet prisms having a plate on which each sheet prism is mounted, each plate having cross graduations for collimation formed thereon.

22. A reflecting sheet prism device according to claim 21, wherein said light-shielding member includes a cap for covering at least one of said two sheet prisms.

23. A reflecting sheet prism device according to claim 21, wherein said light-shielding member includes a shutter which slides in front of at least one of said two sheet prisms.

24. A reflecting sheet prism device according to claim 18, wherein said reflecting sheet prism means includes one sheet prism being removably supportable at the two points at which said reflecting sheet prism means is locatable on said support member.

25. A reflecting sheet prism device according to claim 24, further comprising:
   magnet means for supporting said one sheet prism of said reflective sheet prism means in position at the two points at which said reflecting sheet prism means is locatable.

26. A reflecting sheet prism device according to claim 18, wherein
   the points at which said reflecting sheet prism means is locatable are exterior division point relative to the survey point.

27. A reflecting sheet prism device according to claim 18, wherein
   the points at which said reflecting sheet prism means is locatable are interior division points relative to the survey point.

* * * * *